J. L. ROLLINS.
THREAD COATING MACHINE.
APPLICATION FILED JULY 8, 1908.

962,260.

Patented June 21, 1910.
6 SHEETS—SHEET 1.

Fig. 1.

J. L. ROLLINS.
THREAD COATING MACHINE.
APPLICATION FILED JULY 8, 1908.

962,260.

Patented June 21, 1910.
6 SHEETS—SHEET 2.

J. L. ROLLINS.
THREAD COATING MACHINE.
APPLICATION FILED JULY 8, 1908.

962,260.

Patented June 21, 1910.
6 SHEETS—SHEET 3.

UNITED STATES PATENT OFFICE.

JARROT L. ROLLINS, OF COLFAX, CALIFORNIA.

THREAD-COATING MACHINE.

962,260. Specification of Letters Patent. Patented June 21, 1910.

Application filed July 8, 1908. Serial No. 442,569.

*To all whom it may concern:*

Be it known that I, JARROT L. ROLLINS, citizen of the United States, residing at Colfax, in the county of Placer and State of California, have invented new and useful Improvements in Thread-Coating Machines, of which the following is a specification.

My invention relates to a device for coating thread or flexible cord to be afterward used for the purpose of sealing cans, or containing vessels, or for like or equivalent purposes.

It consists in the combination of parts and in details of construction which will be more fully explained by reference to the accompanying drawings, in which—

For the purpose of sealing jars, cans, and like containing vessels, wax or equivalent plastic material which will afterwards harden, is used to hermetically close such receptacles, and prevent the entrance of air.

It is the object of my present invention to manufacture a wax-covered thread or fibrous base, and to shape these carriers so that they may be fitted to the joints to be sealed without further experiment. The object of thus coating the cord is to saturate with wax which, when it is hardened, will serve to stiffen the cord and make it less pliable and being thus stiffened it may be coiled to a size which is determined so as to fit to the groove or channel of the particular can or receptacle whose cover it is designed to seal in place. It will be obvious that different sizes of coils will be made proportioned to the different sizes of cans, which may be anywhere from one quart or less, up to several gallons, with correspondingly proportioned openings and covers therefor. The cord forms a fibrous packing over which the wax will be melted and the cord will prevent the wax from flowing into the can and its contents.

In my invention I have shown a table A which is revoluble about a vertical axis. This table is designed to turn a quarter revolution at each movement, and to remain stationary for a short period, thus making the four movements of a single revolution intermittent. This movement of the table is effected by gearing to be hereafter described. This table carries four molds 3, and the operation of the apparatus is as follows: The string, thread or other flexible medium which is to be subsequently coated, is brought to the apparatus from any suitable source, and may pass over guide pulleys as at 4. From the first pulley, the cord is carried into a receptacle 5 containing molten wax, and passing beneath a guide roller 6, it is submerged and thoroughly coated with the wax, or with other material suitable for the required purpose. The wax in the body may be reduced to a fluid state, or heat applied in any suitable manner, such as steam conducted through a pipe 93. The cord passes out of the receptacle through an opening 7, and thence over the second guide pulley 4, and to its next destination. This opening 7 serves as a stripper, and removes from the cord any surplus wax that may remain thereon.

After being coiled, the table containing the coil is again moved a quarter revolution, which brings the containing mold, with the string coiled therein, beneath the wax-pot where the table again comes to a rest. At this moment the wax-pot itself commences to revolve, being actuated by a mechanism to be hereafter described, and it makes one revolution. The wax-pot has a valve-controlled opening in the bottom, and when this is opened, the melted wax will commence to flow, and will cover the coiled string with a thicker coating of wax, which will subsequently form the seal for the can or receptacle. After being thus coated, the table again revolves, carrying the mold with it, and the last quarter revolution of the table, brings the mold to a position where the coated cord is to be ejected. It is lifted from the mold by means of mechanism to be hereafter described, and an arm in the form of a sweep removes the finished cord to an endless traveling belt, or to any suitable receptacle; the sweep being immediately returned to its former position, leaving the cord upon the carrier or receptacle. During the time, while the cord is passing through its various stages after being coated, it is cooled and hardened sufficiently to retain its form. This is effected by means of a fluid of any desired character which is circulated through the molds during the final stages of their progress to the point of discharge.

The various steps subsequent to the first coating of the cord previously described, are effected as follows: The coated cord is carried directly across the apparatus above the revoluble table to a coiling device which consists of a cylindrical drum 8. The cord, with its coating of wax, arriving at this drum, passes over a guide pulley 9, thence through a suitable directing loop or device 10.

The winding of the string around the cylindrical drum 8 takes place as follows: The turning of the cylinder is effected by interrupted gears 2 upon the periphery of the table A, and these are caused to engage during the partial revolution of the table with a pinion 11, and through bevel-gears at 12, and a worm-gear at 13, the winding drum 8 is revolved so as to coil the cord upon it. The length of the gears 2, the relation of the intermediate driving gears, and the worm gear, are such that each engagement of a rack or gear 2 will revolve the winding drum a revolution and one-third.

14 are vertically guided and slidable rods extending into the winding drum as far as the slots 15, 15$^a$, 15$^b$. They are normally forced downward by means of coiled springs 16, pushing against the collars 17 on the rods. Two of these rods are always lifted against the tension of the springs by wedge-shaped arms 18, which are turnable about the center-post of the drum 19. When one of these rods is down, it presses upon the end of the string which has entered the slot in the drum, and thus holds it, so that when the drum is revolved, the string which comes from the coating receptacle, before described, will be coiled on the outside of the drum, to be cut and placed in the mold below.

Figure 1:
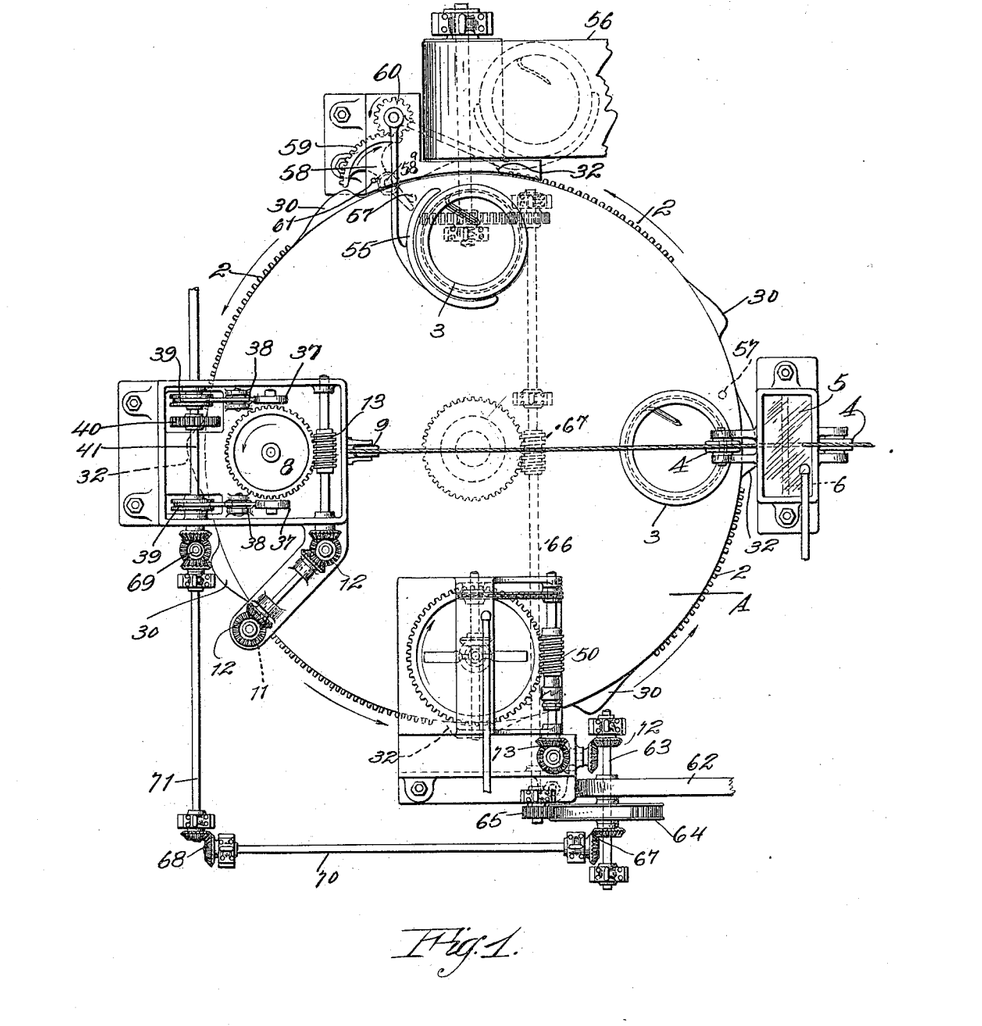
Figure 1 is a plan view of the device.
Figure 2:
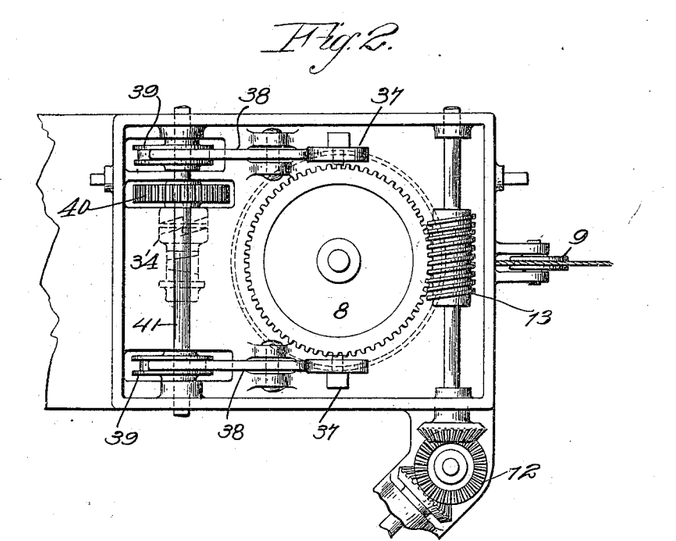
Fig. 2 is a plan view of the string coiling mechanism.
Figure 3:
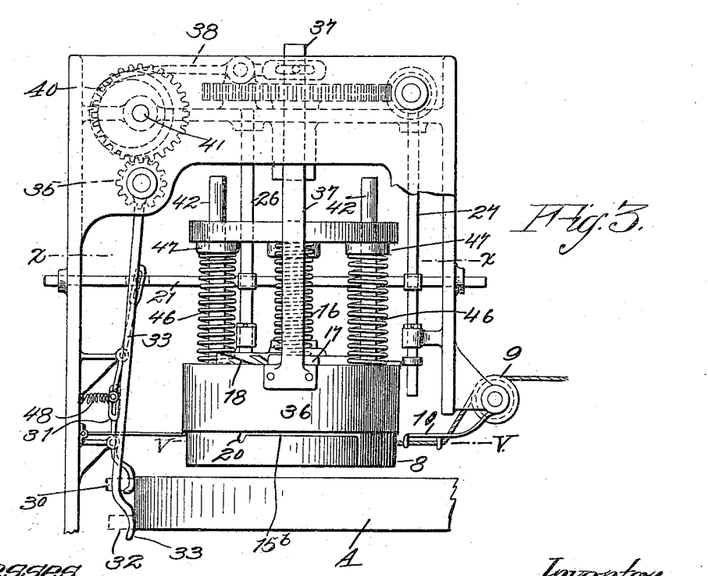
Fig. 3 is a side elevation of same.
Figure 4:
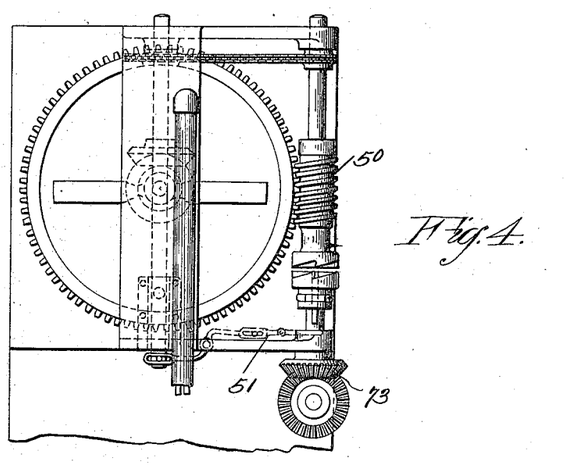
Fig. 4 is a plan view of the wax-pot and connected mechanism.
Figure 5:
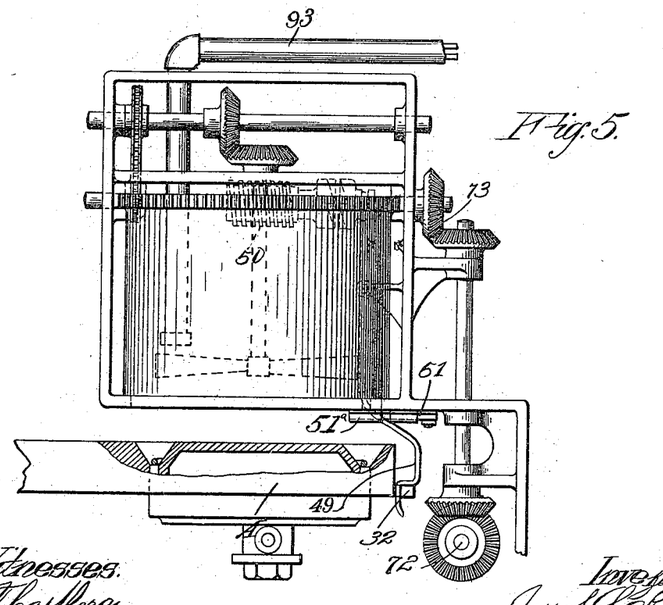
Fig. 5 is a side elevation of same.
Figure 6:
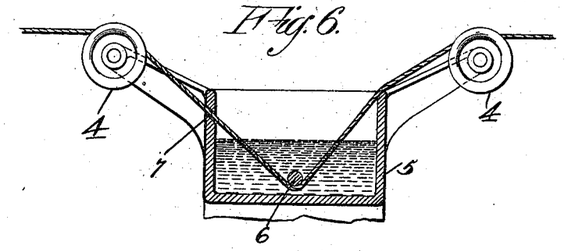
Fig. 6 is a section of the wax-pot, where the string receives its first coating.
Figure 7:
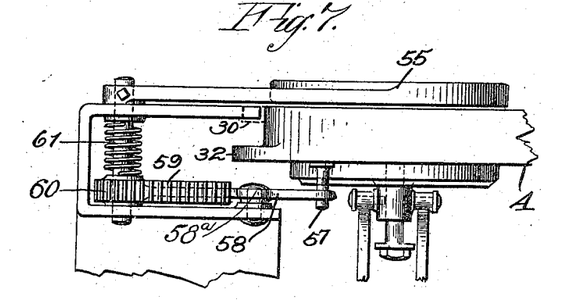
Fig. 7 is a side elevation of the ejecting mechanism.
Figures 12, 13, 15:
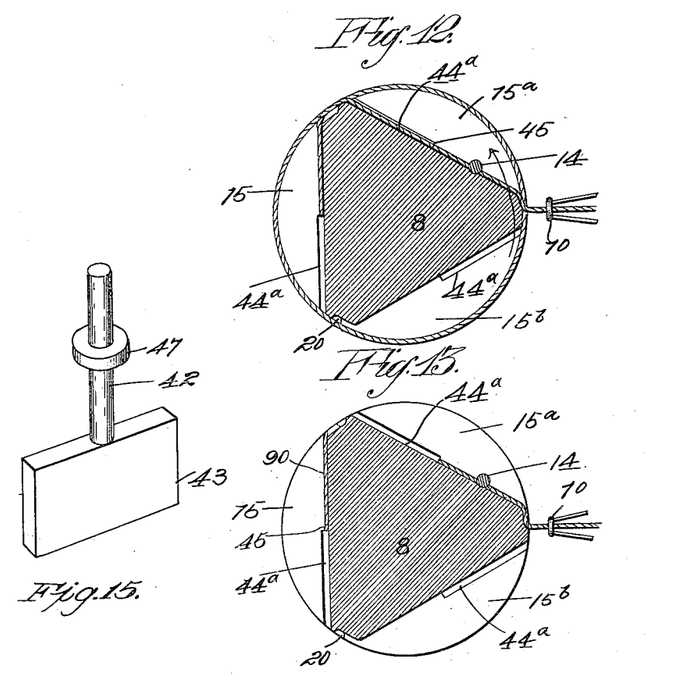
Fig. 12 is a section on line V—V, Fig. 3, of the string-winding drum, showing the string wound and ready to be cut.
Fig. 13 is the same section, showing that the string has been cut, and placed in the mold.
Fig. 15 is a perspective view of the cutter blade and rod.

Fig. 13 is a section on line V—V of Fig. 3. This section shows three slots 15, 15$^a$, 15$^b$, and shows the cord to be wound lying in the slot, and held by the rod 14. The object in passing the cord through the slot is to provide an extension to the coil, which when the cord has been placed upon the can so as to seal the cover thereof, this extension or end projecting inwardly across the top of the cover, provides a loose end, which can be easily grasped by the fingers so as to pull the string out; thus breaking the seal when the can is to be opened. Another object is to provide a cord long enough to be grasped by the pusher rod, hereinafter mentioned, thus holding the end ready for the next coil. This section shows the drum threaded and ready to be wound, as shown in Fig. 3. At the end of each slot, is a small downwardly leading notch 20. This leads the cord down below the level of the slot openings, and prevents the cord from entering each slot, as it is wound around the drum. When one revolution of the drum has taken place, the cord will overlap itself, and again enter a slot. At the end of this slot, the revolution of the drum stops, having made 1⅓ revolution, and the cord is ready to be cut and placed in the mold below.

Fig. 12 is a section similar to Fig. 13, but shows the cord after it has been coiled, and in position ready to be cut. Before the cord is cut, another action takes place. The rod that held the string in the first place must be raised out of contact from the cord by its wedge 18, and the wedge 18$^a$ acted on to release the rod 14$^a$, so that it will hold the end of cord in readiness for a subsequent coil.

Figure 8:
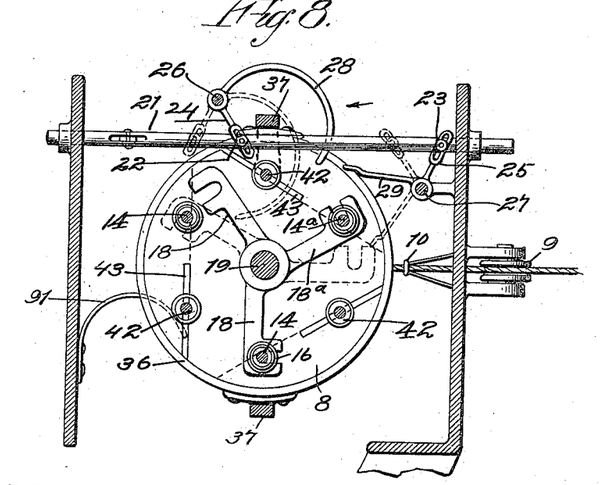
Fig. 8 is a section on line $x$—$x$ Fig. 3.

Referring to Fig. 8, 21 is a horizontally mounted rod reciprocable endwise. Each of these presser-rods are acted on successively and when the point is reached where the cord is to be released, it is effected by means of one of the wedges being forced under the collar of the rod. This raises the rod and releases the string. The replacement of one wedge to lift its rod, and the removal of the other to release its rod, takes place as follows: At 22—23 it is connected through the slotted arms 24—25 with the vertical turnable shafts 26—27. When the rod is moved in one direction, it imparts a partial revolution to the shafts 26—27. When the rod 21 is moved in the direction of the arrow, Fig. 8, the arms 28—29 will take the position shown in dotted lines, same figure. When the arms are thrown into this position, arm 28 will remove the wedge 18$^a$, and release rod 14$^a$, and arm 29 will force wedge 18 under the collar of rod 14, and lift it out of contact with the cord as before described. Just behind the segmental gear rack 2 follows a cam 30. This acts on the lever 31 to reciprocate the rod 21 at the right time, and this removes one wedge and releases a presser rod, and replaces another wedge to lift the other presser rod. After this, the cutting and placing of the coiled cord in the mold, takes place as follows: 32 is another set of cams that follow the cams 30; these cams being in a lower plane. When one of these cams arrives beneath the coiling mechanism, the table comes to rest, while the cord is being cut, and placed in the mold beneath. As before stated, when the cam arrives at this point, the table comes to a stand still; at the same time the cam 32 forces or throws the lever 33 out, and being connected to the jaw clutch 34, locks these and the pinion 38 is set in motion. Exterior to the winding drum 8 is an inclosing and vertically slidable sleeve 36, carried and vertically guided by the slidable rods 37. These rods and the sleeve are depressed when the cord is ready to be cut and placed in the mold below. The rods and sleeve are reciprocated through the pivoted lever arms 38, which in turn are actuated by the cams 39, when the jaw clutch is thrown into action, engaging the pinion 35, which transmits motion to the gear 40 on shaft 41.

As shown in Fig. 13, the cord makes one coil from the directing loop 10 around the circular part of the drum, then passes through the slot, and so on. 42 are vertically movable rods, similar to the pusher rods. These rods are provided with cutter blades 43; there being three of these rods and cutter-blades.

Fig. 15 is a perspective view, showing one of these rods and cutter-blades, each of which is acted on intermittently to sever the cord, passing through the slot $15^a$, shown in Figs. 12 and 13.

Figure 14:
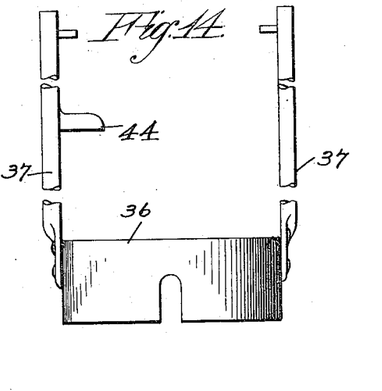
Fig. 14 is a detail view of the vertical slidable sleeve.

Referring to Fig. 14:—On one of the rods 37 is shown a projecting lug 44. When this rod is depressed, the lug will engage with one of the rods 42, and force the knife down; there being a vertical slot $44^a$ provided for each cutter-blade. The blade will sever the cord at the point 45, this being the end of the slot $44^a$, and push the cord down through the slot, at the same time the rods 37 are pushing the sleeve 36 downwardly on the outside of the drum, thus pushing the coiled cord, with its extension, into the mold below. The rods 42 are provided with coil springs 46, which push against the collars 47, and normally cause the knives to assume a raised position. In this position the edges of the knives will be above the level of the horizontal slots 15, $15^a$, $15^b$ so that the cord can enter the slot when the coiling operation is taking place. At the moment the cord has been placed in the mold below, the table having been temporarily arrested beneath the coiling mechanism (just described), while the cord was being cut and pushed into the mold, the table is again set in motion; the cam 32 being part of the table rim, and this being set in motion again, the cam will bear the lever arm 33, the spring 48 will push the arm back into normal position, disengage the jaw clutch, and this part of the mechanism will come to rest until the next cord is ready to be cut. During each coiling and cutting operation, or after a coil has been cut, there will be a short piece of waste cord left in one of the slots, as shown at 90, Fig. 13. This short piece of cord must be removed from the slot before the next coil is wound, or the machine would soon choke up.

As shown in Fig. 8, 91 is a spring arm that enters each of the slots 15, $15^a$, $15^b$. The short piece of waste cord will be wiped out of the slot when the drum revolves, thus expelling the waste material, leaving the slot clean for the next operation.

As before described, the table carrying the molds will be temporarily arrested beneath the coiling mechanism until the cord has been removed. The coil having been deposited in the mold beneath, the table is again set in motion, and travels a quarter revolution until the mold is beneath the wax-pot. Here again the cam 32 forces out the lever arm 49. This arm being fulcrumed, acts simultaneously to engage the clutch on the worm-gear 50 which turns the wax-pot, and through the lever 51, opens the valve $51^a$ beneath the wax-pot. The valve being opened, the wax is allowed to escape through the opening in the bottom of the pot, this opening registering with the circular groove in the mold, the pot being rotated at the same time, the string lying in the bottom of the groove will be covered with a sufficient supply of wax, enough being applied to seal the can for which it is intended. When this operation of supplying the mold with the necessary quantity of wax has been completed, the table is again started, and revolves another quarter revolution. As the mold, with the cord and wax filling, is now ready for discharge, with the exception of proper cooling, nothing occurs to the mold at this last stop; it simply passes beneath the primary coating and cord-transferring mechanism first described, and will be arrested there, while operations are taking place at the other three stations.

Figures 9, 10, 11:
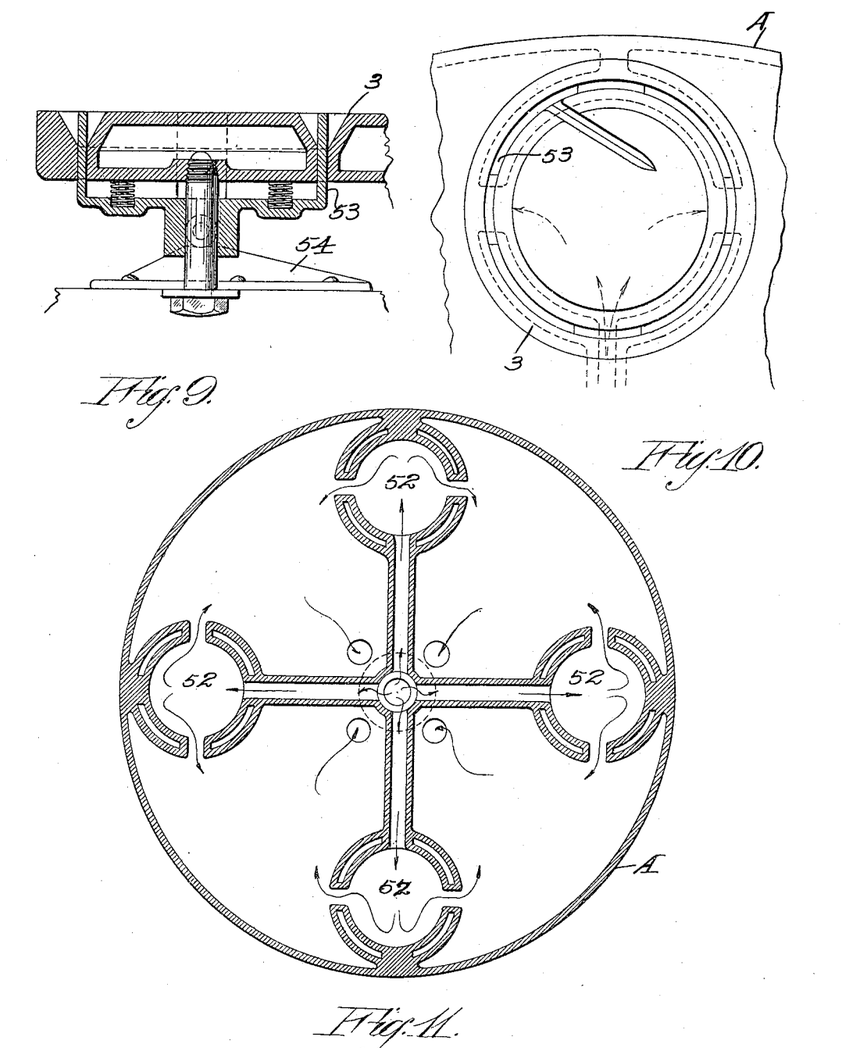
Fig. 9 is a vertical section of one of the molds.
Fig. 10 is a plan view of one of the molds.
Fig. 11 is a horizontal section of the table.

During the different stages of making, and until it reaches the discharge, it is subjected to a current of cooling fluid or liquid, which is circulated around and through the molds, as shown at 52, Fig. 11, so that by the time the mold has reached the point of discharge, the wax will be sufficiently hardened for the purpose. The next movement of the table carries this mold to the point of discharge where by means of a vertically slidable ring 53 which extends up into the annular groove or channel of the mold, and a cam 54 which actuates this ring at the proper time, the completed and waxed cord will be elevated out of its mold. After this takes place, the arm 55 sweeps over the surface, and in the plane in which the cord lies, thus sweeping it off either into a receptacle, or upon an endless traveling belt, as at 56. This arm is actuated as follows: When the table has carried the mold to the point of discharge, a pin 57 contacts with an arm 58 fulcrumed at 58ª, and carrying a toothed segment 59 at its opposite end. This segment engages with a pinion 60, which pinion impels the arm 55, previously described, and which sweeps the finished cord from its position above the mold. As soon as the table has passed, carrying the pin 57 beyond the arm 55, the latter and the pinion will be automatically returned to their normal position, with the arm 55 in readiness to receive and discharge another cord; this movement being effected by a spring 61, or equivalent means. This mold being empty will then be carried by the next movement to the cooling mechanism previously described. Thus the molds around the periphery of the table are successively presented to the various parts of the apparatus for completing the string.

Power to drive the apparatus is transmitted through a belt 62 to a pulley upon the shaft 63. Upon this shaft is fixed a mutilated gear-wheel 64, the toothed portion of which intermittently engages with a pinion 65 upon the countershaft 66, and this shaft carries a worm-gear 67, through which power is transmitted to revolve the table, whenever the toothed portion of the gear 64 is in engagement with the pinion 65. As soon as the blank portion of the gear 64 coincides with the pinion, the latter and its connected parts will stop, thus giving the table the periods of rest for the completion of the operations previously described. By means of the bevel-gears 67, 68, 69, and intermediate shafts 70—71, power is constantly transmitted to that part of the coiling mechanism which cuts and pushes the cord of the arm 8 into the mold. This part of the mechanism is only operated when the clutch becomes engaged, as before described. The coiling of the cord on the drum takes place while the table is in motion, through the segmental gears, and intermittent gearing 12 and 13. Power is transmitted to revolve the wax-pot through the bevel-gears 72, 73, and worm 50, the wax-pot revolving one revolution while the clutch is engaged.

Having thus described my invention, what I claim and desire to secure by Letters Patent is—

1. An apparatus for the coating and coiling of flexible, fibrous strings, a revoluble table, molds carried thereon, means for first applying a coat of wax to the string, means for transferring the coated string, means for coiling said string into a circle, means for applying a further coating to the upper side only, and means for discharging the finished product.

2. In an apparatus of the character described, a revoluble table, molds carried near the periphery thereof, mechanism by which the table is moved intermittently a quarter revolution at each forward turn and mechanism located at the points where the table is arrested for successively coiling, covering and discharging the string.

3. In an apparatus of the character described, an intermittently revoluble table, molds carried near the periphery, adapted to contain a flexible string, means located with relation to one side of the table for coating said string, and delivering it therefrom to a coiling mechanism.

4. In an apparatus of the character described, an intermittently revoluble mold-carrying table, means located with relation to the table whereby a string is coated or saturated with wax, a coiling device to which the string is subsequently delivered, said device consisting of a cylindrical drum, means for gripping the end of the string within the drum, means for rotating the drum whereby the string is coiled thereon, means for subsequently severing the string and forcing it from the drum into the mold beneath.

5. In an apparatus of the character described, an intermittently revoluble table, molds carried near the periphery, to contain a string coating means located with relation to one side of the table at a point of rest, a coiling mechanism to which the coated string is delivered, said mechanism including a cylindrical drum with means for rotating, an opening through which the string is delivered to the interior of the drum, a gripping device by which the end of the string is retained while the drum is rotated and the string coiled upon its exterior, a slot made in the drum through which the latter portion of the coil is carried so as to make an inturned end, a cutter by which the cord is severed, a sleeve or ring slidable upon the exterior of the drum, and means whereby it is moved vertically to force the string from the drum to the mold beneath.

6. In an apparatus of the character described, an intermittently revoluble table, molds carried near its periphery, mechanism for coiling a wax-coated string during the partial revolution of the table, other independently actuated mechanism whereby the coil is disengaged from the coiling drum and deposited in the mold while the table is at rest.

7. In an apparatus of the character described, a horizontal table having molds near its periphery, means whereby the table may be intermittently rotated, said means including a revoluble shaft carrying a mutilated gear, a countershaft having a pinion with which the toothed portion of the mutilated gear engages, and a worm-gear carried by the pinion shaft and acting to revolve the table.

8. In an apparatus of the character described, an intermittently revoluble table, molds carried near the periphery thereof, mechanism located above the line of travel of the molds for applying a coating to a flexible filament, coiling said filament, applying a surface coating upon one side of the filament and discharging the finished product in successive operations, said devices registering with the molds in their stationary position.

9. In an apparatus of the character described, an intermittently revoluble table, molds carried near the periphery thereof, superposed stationary mechanism whereby a flexible filament is first coated, then coiled and deposited in the mold, a wax-containing pot in line with which said mold is caused to register, said pot having a valve-controlled opening in the bottom, in line with the periphery of the mold, and mechanism whereby the valve is opened and the pot is revolved to deposit a coating upon the upper side of the mold contained cord.

10. In an apparatus of the character described, an intermittently revoluble table, molds carried near the periphery of the table, superposed devices whereby a flexible filament is coated, coiled, and the subsequent additional coating placed upon one side thereof, chambers for the circulation of a cooling fluid around the molds, plates slidable through slots in the periphery of said chambers, whereby the finished coil is ejected from the mold at its final stop, and means whereby the coil is removed and deposited at one side of the apparatus.

In testimony whereof I have hereunto set my hand in presence of two subscribing witnesses.

JARROT L. ROLLINS.

Witnesses:
E. H. HORM,
W. B. FOWLER.